United States Patent [19]

Hsu

[11] Patent Number: 5,642,404
[45] Date of Patent: Jun. 24, 1997

[54] CLASP STRUCTURE FOR CELLULAR PHONE AND BATTERY SET

[76] Inventor: Cheng-Ming Hsu, No. 38, Alley 2, Lane 168, Ching Nien Rd., Taipei, Taiwan

[21] Appl. No.: 555,458

[22] Filed: Nov. 13, 1995

[51] Int. Cl.[6] .................................................. H04M 11/00
[52] U.S. Cl. ............................ 379/59; 379/58; 455/90
[58] Field of Search ........................... 455/89, 90, 343; 379/58, 59, 61; D13/120, 119

[56] References Cited

U.S. PATENT DOCUMENTS

| | | | |
|---|---|---|---|
| 3,728,664 | 4/1973 | Hurst | 455/89 X |
| 3,969,796 | 7/1976 | Hodsdon | 455/90 X |
| 4,709,201 | 11/1987 | Schaefer | 455/89 X |
| 5,039,580 | 8/1991 | Mori et al. | 429/97 |
| 5,140,138 | 8/1992 | Tanaka | 235/1 D |
| 5,200,883 | 4/1993 | Kobayashi | 361/683 |
| 5,208,116 | 5/1993 | Joh | 429/96 |
| 5,317,247 | 5/1994 | Chong | 455/89 X |

Primary Examiner—Dwayne Bost
Assistant Examiner—Scott Richardson
Attorney, Agent, or Firm—Pro-Techtor International

[57] ABSTRACT

A clasp structure of a cellular phone and its battery set includes a cellular phone and a battery set. The battery set includes a case and a battery base. On the battery case there is a clasp component which uses the elasticity of a spring component to join and to separate the cellular phone and the battery set. When the battery has exhausted its power, the user pushes the clasp component to make the battery set separate from the cellular phone.

1 Claim, 4 Drawing Sheets

CLASP STRUCTURE FOR CELLULAR PHONE AND BATTERY SET

BACKGROUND OF THE INVENTION

1. Field of the Invention

The present invention relates to a clasp structure for a cellular phone and its battery set which uses the elasticity of a clasp component and a spring component to join and to separate the cellular phone and its battery set.

2. Description of the Prior Art

Referring to FIG. 1, a conventional cellular phone 10 is comprised of a cellular phone 11 and its battery set 12 which comprises a case 121 and a battery base 122. The battery set is clasped with the cellular phone by the bottom trough 124 of clasp 123 on the top of battery base 122 to buckle with the clasp trough 111 of the cellular phone 11.

When the battery's power is exhausted, the battery set 12 needs to be replaced. When separating the battery set 12 from the cellular phone 11, the bottom trough 124 of the clasp 123 separates from the clasp trough 111 of the cellular phone 11. When removing the battery set, pressure is applied on the top of the clasp 123 to push the battery set 12 downward in order to make the battery 122 separate from the cellular phone 11.

However, the clasp 123 and the battery 122 are one unit, and the joining part is a rectangular support shaft. In order to separate the bottom trough 124 and the clasp trough 111, the support shaft of clasp 123 and the main body of the clasp trough 111 should have a gap in order to allow the support shaft of clasp 123 to deform due to torsion and to make the bottom trough 124 separate from the clasp trough 111.

However, when pushing the top of the clasp 123 downward, it is easy to close the gap and to make the support shaft of the clasp 123 not easy to deform; thus the bottom trough 124 will not separate from the clasp trough 111. The user has to apply greater pressure on the top of the clasp 123 to push the battery 12 downward, which can lead to the clasp 123 breaking.

SUMMARY OF THE INVENTION

The present invention relates to a clasp structure of a cellular phone and its battery set which comprises a cellular phone and a battery set which comprises a case and a battery base. On the battery case there is a clasp which utilizes elasticity of the clasp component and the spring component to join and to separate the cellular phone and the battery set. When the battery has exhausted its power and the battery set 12 needs to be replaced, the user pushes the clasp to make the battery set separate from the cellular phone. Thus not only is it easy to separate the battery from the phone, but also the clasp will not break.

BRIEF DESCRIPTION OF THE DRAWINGS

The drawings disclose an illustrative embodiment of the present invention which serves to exemplify the various advantages and objects hereof; and are as follows.

DETAILED DESCRIPTION OF THE PREFERRED EMBODIMENT

Figure 1:
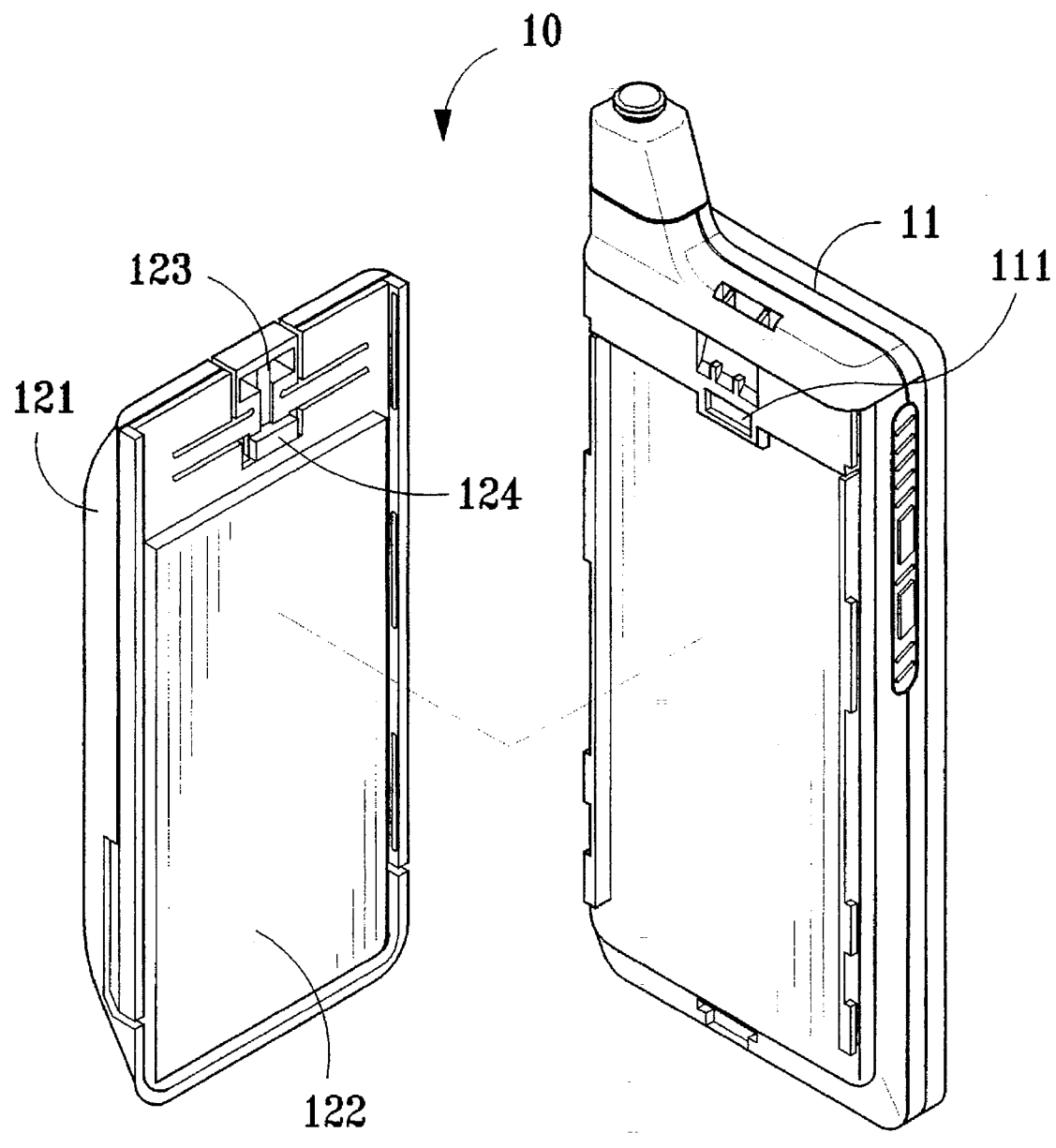
FIG. 1 is an exploded view of the conventional cellular phone.
Figure 2:
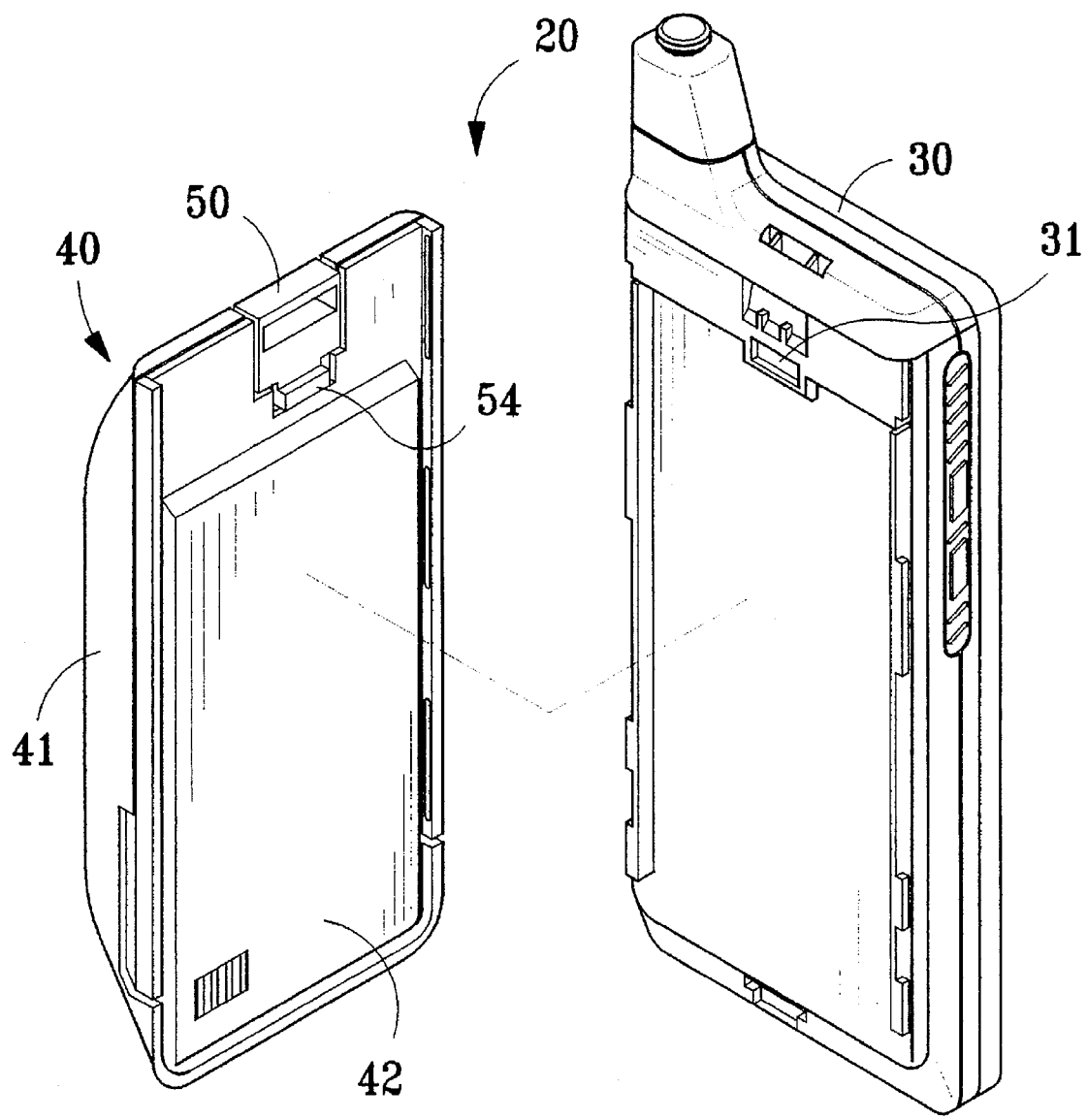
FIG. 2 is a perspective exploded view of the present invention.
Figure 3:
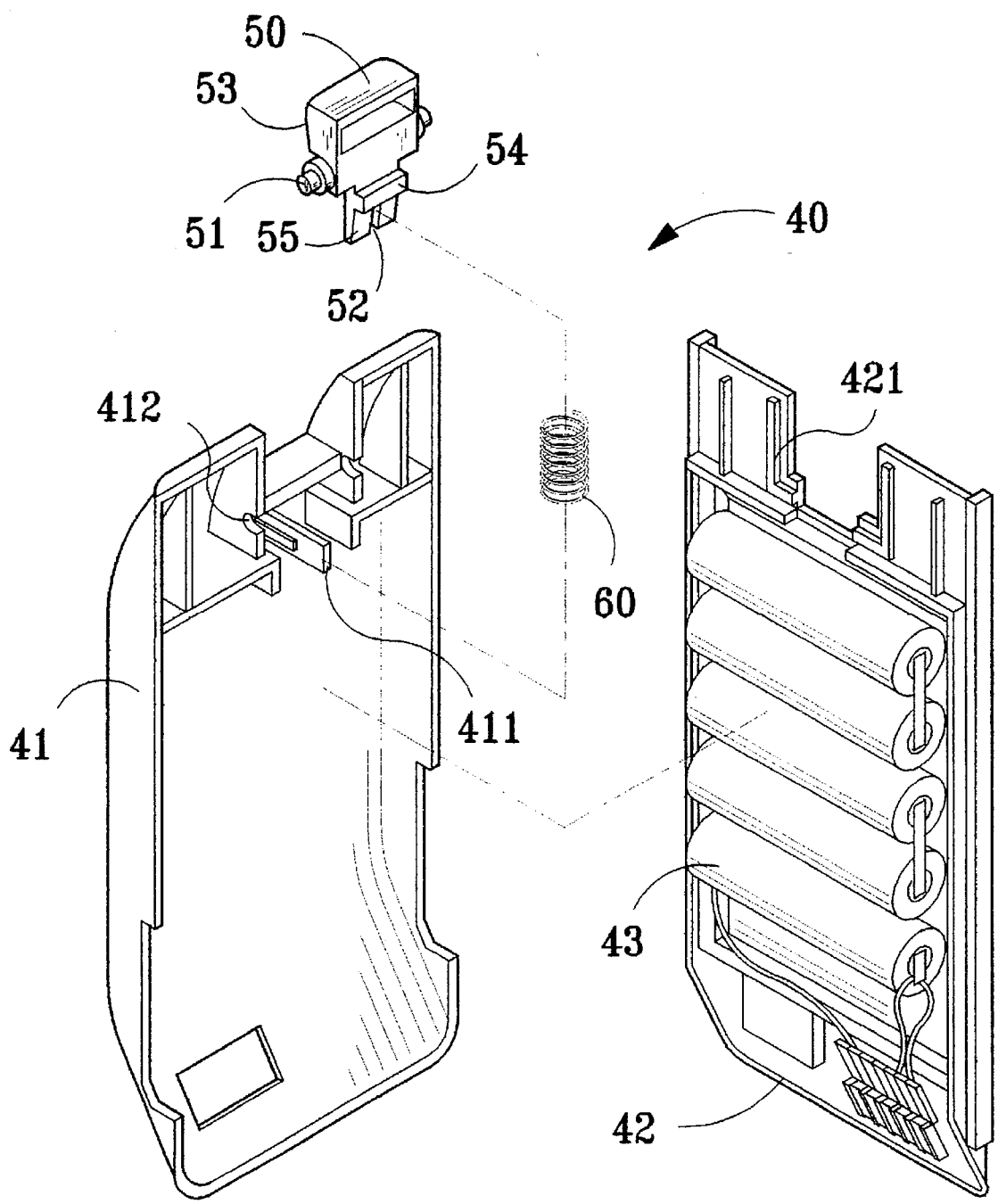
FIG. 3 is a perspective exploded view of the battery set of the present invention.
Figure 4:
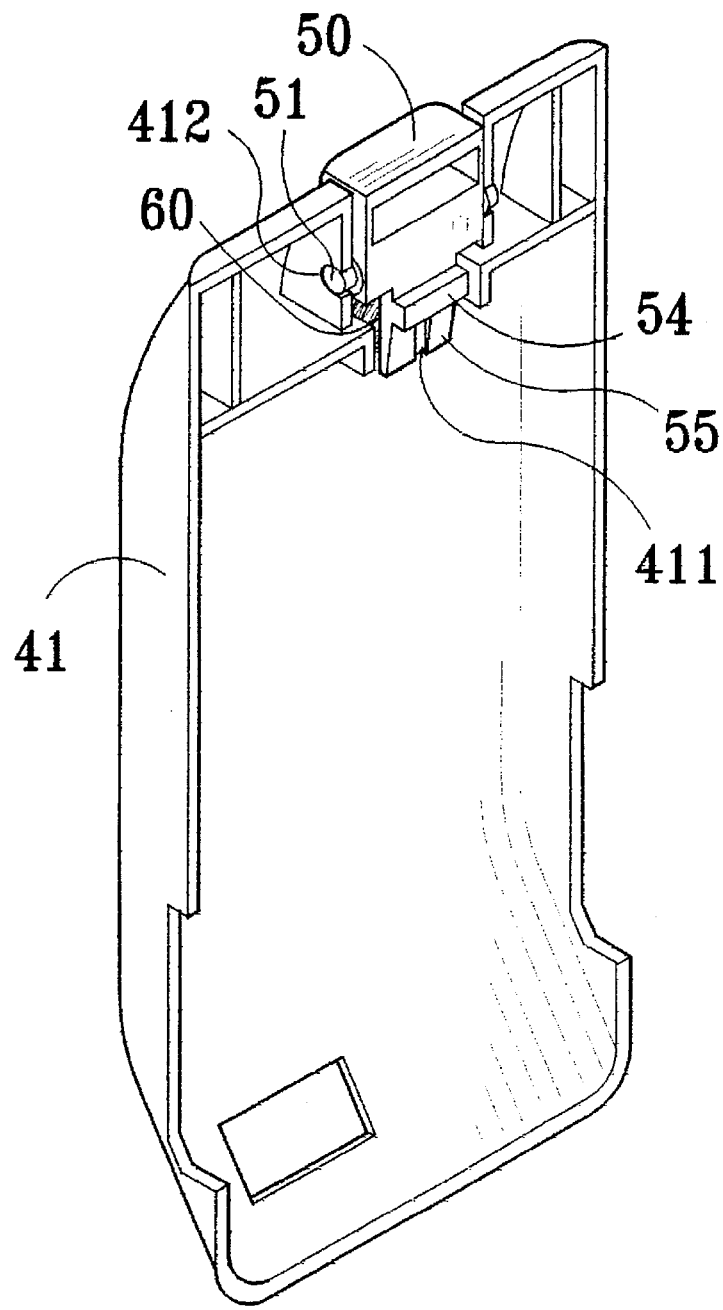
FIG. 4 is a perspective view of the case and the clasp of the present invention.

Referring now to FIGS. 2, 3 and 4, the cellular phone set 20 comprises a cellular phone unit 30 and a battery set 40 which comprises a case 41 and a battery base 42. A clasp 54 of the clasp component 50 on the top of the case 41 joins with the clasp trough 31 of the cellular phone to form the cellular phone set.

The battery set 40 comprises a case 41 and a battery base 42. A spring component 60 is placed on a protuberance 411 of the top of the case 41. Extending from each side of the clasp component 50, there is a protuberance 51 which fits into the trough 412 of the case 41. The bottom of the clasp component 50 has a retaining board 55 which has a notch 52. The notch 52 fits over the protuberance 411 of the case 41 in order to make the two sides of the retaining board 55 block the spring component 60.

The battery 43 is placed inside the battery base 42. The battery base 42 joins together with the case 41 by joining the L-shaped trough 421 of battery base 42 with the trough hole 412 on the top of the case 41. Thus, the clasp component 50 uses the protuberance 51 as a fulcrum, and uses the elasticity of the spring component 60 to join the clasp 54 of the clasp component 50 with the clasp trough 31 of the cellular phone in order to form a cellular phone set. When the user wants to replace the battery 43, he pushes the pushing part 53 on the top of clasp, component 50 slightly, and the cellular phone and the battery set will separate.

Due to the above described combination, the user needs only to apply very slight pressure on the pushing part 53 of the top of clasp component 50, and the clasp 54 will separate from the clasp trough 31 completely. Thus, the user only applies a very small force to the battery base 42, and it is very easy to take off the battery without any damage.

Many changes and modifications in the above described embodiment of the invention can, of course, be carried out without departing from the scope thereof. Accordingly, to promote progress in science and the useful arts, the invention is disclosed and is intended to be limited only by the scope of the appended claims.

What is claimed is:

1. A clasp structure for a cellular phone and battery set comprising:

a cellular phone unit with a clasp trough on a rear side thereof and a battery set, said battery set comprises a battery case and a battery base;

said battery case includes a protuberance and a trough hole on a top of said case, a spring component mounts on said protuberance of said battery case, a clasp component which has an integral pushing part and a clasp protuberance extending therefrom, said clasp protuberance is received in said clasp trough of said cellular phone unit, an upper planar surface of said clasp protuberance being urged against a single planar surface of said clasp trough by said spring component, thereby joining said battery set and said cellular phone unit, said battery base has an L-shaped trough near a top end thereof, said L-shaped trough is received in said trough hole on said top of said case to join said battery base and said battery case; such that said battery case is released from said cellular phone unit by applying pressure to said pushing part such that said clasp protuberance is removed from said surface of said clasp trough.

* * * * *